United States Patent [19]

Cushing

[11] 4,050,301
[45] Sept. 27, 1977

[54] ELECTROMAGNETIC WATER CURRENT METER WITH SYNTHETIC DIRECTION FIELD

[76] Inventor: Vincent J. Cushing, 410 Standish Drive, Deerfield, Ill. 60015

[21] Appl. No.: 690,747

[22] Filed: May 27, 1976

[51] Int. Cl.$^2$ .............................................. G01F 1/58
[52] U.S. Cl. .................................. 73/189; 73/194 EM
[58] Field of Search .............. 73/194 EM, 189, 170 A

[56] References Cited

U.S. PATENT DOCUMENTS

| | | | |
|---|---|---|---|
| 2,375,227 | 5/1945 | Hillman | 73/189 |
| 3,161,047 | 12/1964 | Griswold | 73/189 |
| 3,372,585 | 3/1968 | Niskin | 73/170 A |
| 3,641,816 | 2/1972 | Chambolle et al. | 73/189 |
| 3,937,078 | 2/1976 | Williams | 73/189 |

OTHER PUBLICATIONS

Hanff; Michel, Proceedings of the Conference on Electronic Engineering in Ocean Technology, Swansee Wales, UK, (Sept. 21-24, 1970), pp. 371-380.

*Primary Examiner*—Charles A. Ruehl
*Attorney, Agent, or Firm*—Pollock, Vande Sande & Priddy

[57] ABSTRACT

An electromagnetic water current meter has associated therewith apparatus to provide an artificially generated field having a direction of predetermined orientation relative to a known coordinate system. In addition to the conventional signal processing apparatus associated with the electromagnetic water current meter, additional signal processing apparatus is provided to produce signals related to the orthogonal components of the artificial field relative to the unknown orientation of the transducer. Signal responsive means is provided which responds to the electromagnetic water current outputs, as well as to the signals representative of the orthogonal components of the artificial field to produce output signals representative of the flow velocity in a coordinate system determined by the direction of the artificial field.

19 Claims, 7 Drawing Figures

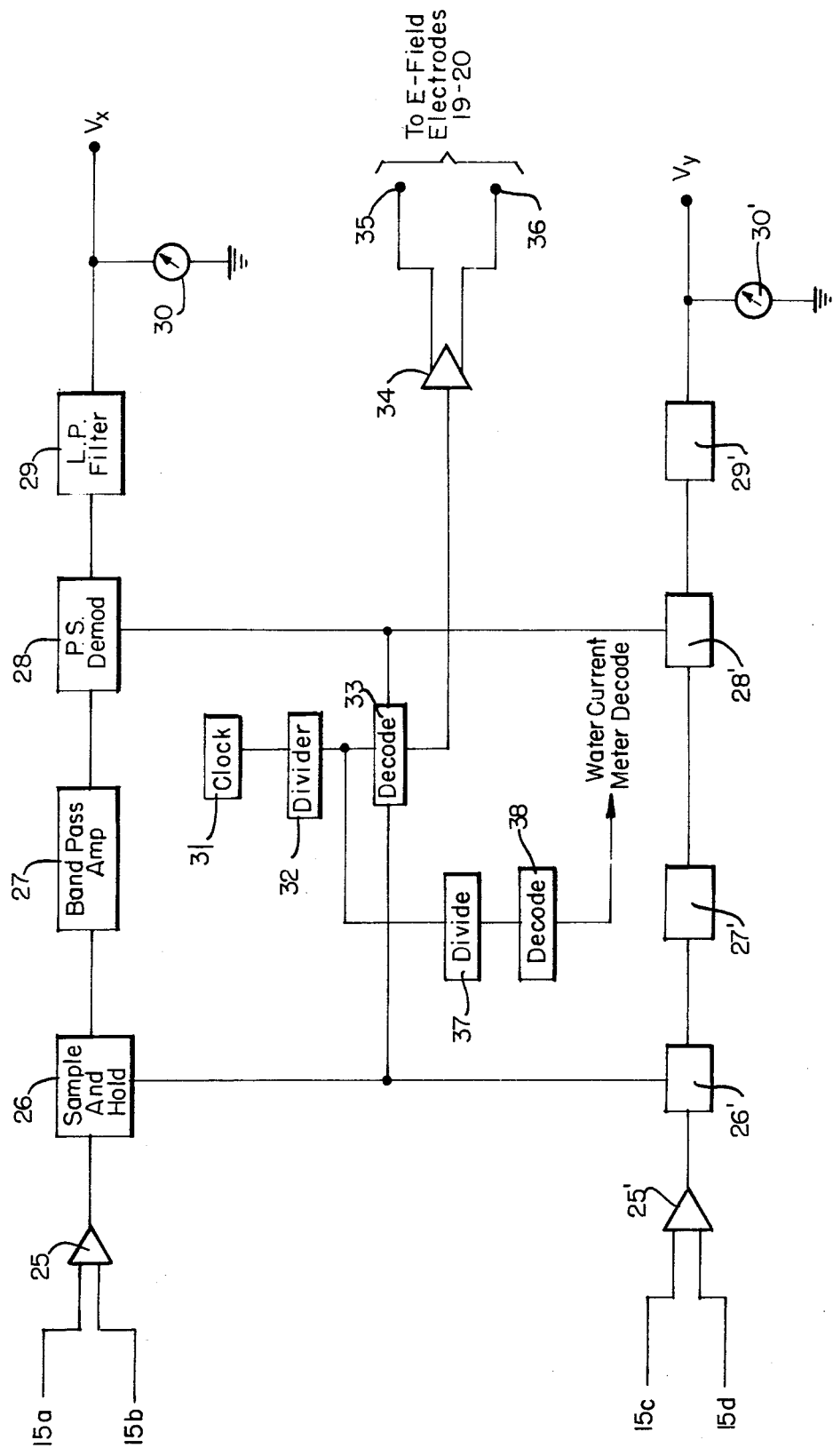

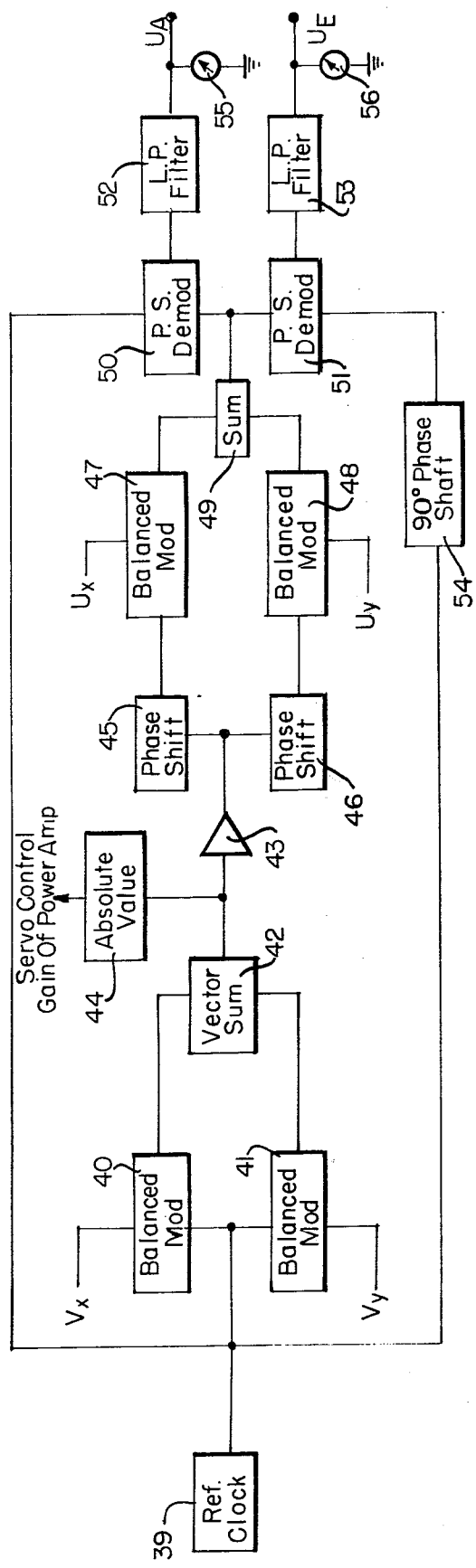
FIG. 4A.
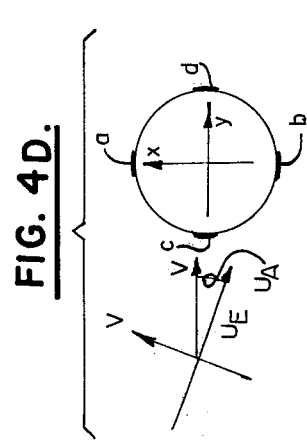
FIG. 4D.
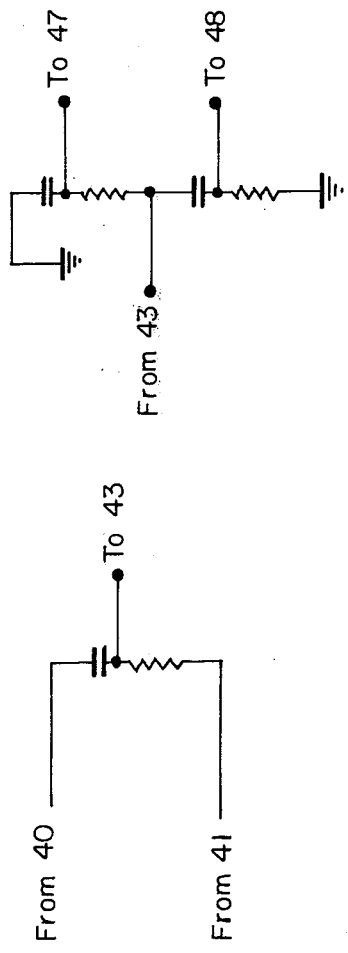
FIG. 4C.
FIG. 4B.

ELECTROMAGNETIC WATER CURRENT METER WITH SYNTHETIC DIRECTION FIELD

FIELD OF THE INVENTION

The present invention relates to improvements in electromagnetic water current meters, and more particularly to devices for processing the output signals of an electromagnetic water current meter so as to provide components thereof in a known coordinate system notwithstanding the fact that the orientation of the transducer cannot be maintained fixed with regard to the known coordinate system.

BACKGROUND OF THE INVENTION

Electromagnetic water current meters are well known in the art, see my previous U.S. Pat. Nos. 3,759,097 and 3,855,858, for examples of this apparatus. The latter-mentioned patent describes the use of electromagnetic water current meters for monitoring flow velocity in open bodies of water, i.e., rivers and oceans. In such an application, the transducer is supported from above, such as by being attached to a cable supported on land, by a boat, or by a buoy. In one configuration, the cable may serve to connect the electrodes in the transducer to signal processing apparatus which would normally be located on or above the surface of the body of water. In another application, however, the signal processing circuitry is included within the transducer housing, per se, and is thus submerged. In the latter application, conventionally, the housing would include a magnetic tape recorder or other type of data memory for storage of appropriate signals definitive of flow velocity at predetermined periods of time.

Whether the transducer is connected to surface mounted signal processing apparatus, or is self-contained, the voltages induced on the several electrodes can be employed to determine flow velocity with respect to the orientation of the transducer. If the transducer is not rigidly mounted, but instead can freely rotate, this data may not be completely meaningful. That is, measuring components of flow velocity with regard to an unknown coordinate system may not produce meaningful information. Rather, flow velocity should be determined with regard to some known coordinate system. Chambelle et al, in U.S. Pat. No. 3,641,816, discloses a "Device for Metering a Vector Particularly applicable to the Metering of a Fluid Flow Velocity". In short, that patent discloses an electromagnetic water current meter which is associated with a magnetometer for determining orientation of the meter with regard to the earth's magnetic field so that the components of flow velocity sensed by the transducer can be related to a fixed coordinate system, i.e., the conventional geomagnetic coordinate system used to define locations on the earth's surface with regard to the North magnetic pole. While there is no reason to believe that the device disclosed in the aforementioned patent does not operate quite well in its intended environment, there are limitations to the application of this structure.

The Chambelle apparatus includes a magnetic compass which determines direction by sensing the horizontal component of the earth's magnetic field. At the lower latitudes this is perfectly satisfactory. However, at high latitudes — near the north and south magnetic poles — the earth's magnetic field is largely vertical, having very little horizontal component, and large errors occur when one tries to use a magnetic compass to determine direction. In these areas, the patented apparatus might not produce useful information.

A further limitation on the employment of the apparatus disclosed in the '816 patent occurs where it is desirable to measure flow velocity with regard to a known corrdinate system which is not defined or related to the North magnetic pole. Thus, for instance, a user might be interested in the flow velocity at the mouth of a channel or river, in which case it would be desirable to measure flow perpendicular to the longitudinal extend of the channel or river. In this case, determining flow velocity with regard to the directions of North and East would only introduce the additional complexity of further data reduction to obtain flow velocity in the desired direction.

A further example of situations in which the 3,641,816 apparatus would not be usable, is the situation of measuring flow velocity in areas where the earth's magnetic field may be masked by artificially induced fields. In this case, of course, the magnetometers would not be able to sense the earth's magnetic field and thus the 3,641,816 apparatus would not be usable.

In view of the foregoing, it is an object of the present invention to provide apparatus for conditioning the output of an electromagnetic water current meter to provide signals representative of orthogonal flow velocity components with reference to a known coordinate system, which known coordinate system is not defined by the earth's North magnetic pole. It is another object of the present invention to provide such a device in which the knwon coordinate system can be located at will in any desired direction. Still other and further objects of the invention will be apparent from a reading of this application.

SUMMARY OF THE INVENTION

In accordance with the invention, an electromagnetic water current meter includes a transducer driving a signal processor for deriving signals representative or orthogonal flow components of velocity in a known coordinate system, even though the transducer is not fixed relative to the known coordinate system. To effect this, means are provided for generating an artificial field having a predetermined direction relative to the known coordinate system. Sensing means, integral with the transducer, sense orthogonal components of the field. Since the sensing means is integral with the transducer, these components are sensed relative to the unknown corrdinate system in which the transducer is oriented. Signal processing means then responds to both the flow related signals in the unknown coordinate system as well as to the field produced signals in the unknown coordinate system to produce flow related signals in the known coordinate system.

In a preferred embodiment of the invention, the sensing means for sensing orthogonal components of the field comprise the electrodes of the transducer adapted to sense flow related signals. To differentiate between the flow related signals and the field related signals, the field generating means operates at a frequency different from the electromagnetic field inducing flow related signals. Preferably, for ease in construction, both the electromagnetic field and the artificial field can be driven by the same oscillator, using appropriate dividers, so that one frequency is a multiple of the other. In this system, the artificial field having a predetermined direction with regard to the known coordinate system can be an electric field. This field can be oriented in direction with regard to any system of known coordinates, such as the North magnetic pole, any other fixed coordinates, or even moving coordinates. For instance, if the artificial field has a direction which is known with regard to the direction of motion of a ship, then so long as the direction of the ship is known, with regard to fixed coordinates, flow velocities can be obtained with respect to those fixed coordinates.

BRIEF DESCRIPTION OF THE DRAWINGS

The invention will now be disclosed in the remaining portion of the specification when taken in conjunction with the attached drawings in which like reference characters identify an identical apparatus, and in which:

FIG. 3 is a schematic diagram of a portion of the apparatus of this invention;

FIG. 4A is an additional block diagram of other components of the invention;

FIG. 4B and 4C are examples of circuitry that can be employed with the invention; and, FIG. 4D is an exemplary embodiment of the orientation of a transducer with regard to an exemplary flow direction and a knwon coordinate system.

DETAILED DESCRIPTION OF INVENTION

Figure 1:
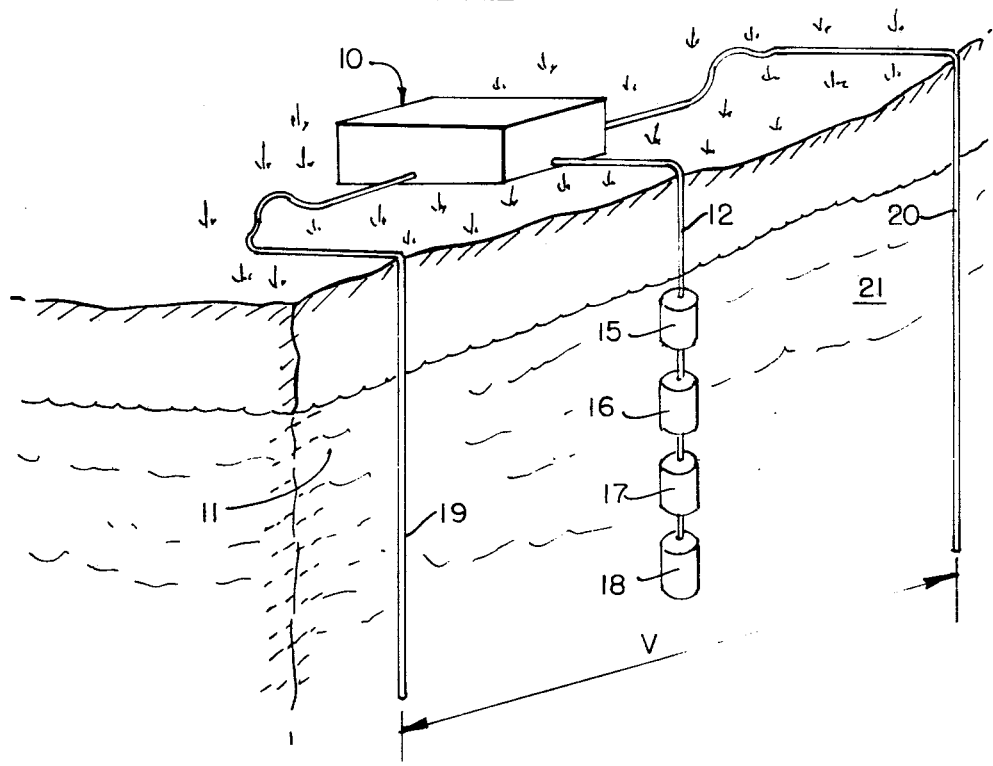
FIG. 1 is a schematic representation of one application of the present invention.

FIG. 1 illustrates, somewhat schematically, one particular application of the invention, in which a plurality of electromagnetic flow transducers 15, 16, 17 and 18 are supported by a cable 12, in a body of water 21, such as the ocean. The cable 12 serves to connect the transducers to signal processing the drive circuitry 10 which may be supported above the surface of the body of water 21 on a vessel or on a sheet of ice 11. For example, the apparatus thus depicted may be located at the far Northern latitudes, where a magnetic compass or magnetometer, as disclosed in U.S. Pat. No. 3,641,816, is not usable. The object of employing transducers 15-18 is to sense flow velocity and direction at various different depths, although the invention can be employed with but a single transducer, such as any of transducers 15-18. As is well known to those skilled in the art, and as exemplified by my previously cited patents, each of the transducers 15-18 employs a plurality of sensing electrodes and an electromagnet for producing a suitable magnetic field in the vicinity of each of the electrodes. Flow velocity signals are induced in the electrodes which are related to flow velocity of the medium in which the transducer is supported, such as the body of water 21. In the example illustrated in FIG. 1, the transducers 15-18 do not include any active circuitry, and the voltages sensed by the electrodes can be transmitted, via cable 12 to signal processing circuitry 10 located on or above the surface of the medium. In addition to the foregoing apparatus, an artificial field producing means including drive circuitry 10 and electrodes 19 and 20 are illustrated. The artificial field producing means produces a field having a predetermined direction, illustrated by the direction V in FIG. 1. This predetermined direction V is determined with regard to some known coordinate system, such as the well known North, East, South and West system. In a case where the apparatus illustrated in FIG. 1 is located in a region wherein magnetic compasses are not reliable, the direction V would have to be determined by some means other than a magnetic compass and such means are known to those skilled in the art. For instance, the direction can be determined by astronomical observation and the like.

In other embodiments of the invention, while the relationship of the transducers 15-18, signal processing apparatus 10 and artificial field producing means 19 and 20 will be maintained, the known coordinate system with respect to which the direction V is predetermined, need not be fixed. For instance, if it is desired to measure flow velocity aboard a moving vessel, the direction V may be known with regard to the direction of movement of the vessel, i.e., a known but unfixed coordinate system. In such an example, to determine flow velocity relative to a fixed coordinate system such as that of the North, East, South, West system it is also necessary to have knowledge of the vessel's direction with regard to that known coordinate system.

Although FIG. 1 is an example of the use of the invention at high latitudes where magnetic compasses and magnetometers are unreliable, the invention need not be restricted to these areas. For example, if it is desired to measure flow velocity and direction at the mouth of a river or channel, it may be desirable to determine this velocity with respect to a fixed coordinate system which is not that of the North, East, South, West system, but some system related to the geometry of the river or channel. For instance, if one desired to determine the velocity of flow out of the channel, that is, parallel to the longitudinal extent of the river or channel, the artificial field producing means could be located to produce a field having a direction V transverse or parallel to this direction. Other applications of the invention will be readily apparent to those skilled in the art.

Figure 2:
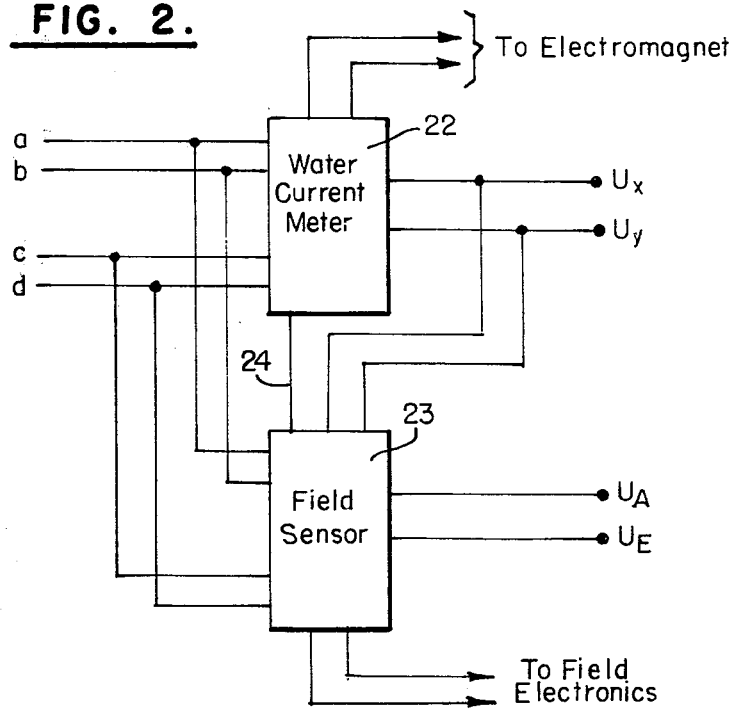
FIG. 2 is a block diagram of the relationship between the known electromagnetic flow meter with respect to other components of the invention.

FIG. 2 is a block diagram of the relationship between the conventional electromagnetic water current meter, such as the current meter 22, with the signal responsive means 23 in FIG. 2. More particularly, the generalized transducer, any one of transducers 15-18, may employ two pair of electrodes, each electrode of a pair diametrically opposed to the remaining electrode of the pair. Thus, for instance, as illustrated in FIG. 4D, electrodes $a$ and $b$ define a direction X, and electrodes $c$ and $d$ define a direction Y, orthogonal to the direction X. While the transducer will readily determine the orthogonal components of flow velocity in the XY coordinate system, since this coordinate system is not fixed nor predetermined, the object of the invention is to produce orthogonal components of flow velocity in a known coordinate system.

To this end, the electrodes $a$ and $b$, as well as elctrodes $c$ and $d$, are conductively connected to the electromagnetic current meter 22. The meter 22 produces DC signals Ux and Uy which are respectively proportional to components of flow velocity in the X and Y directions. The flow meter 22 also produces a signal to drive an electromagnet for producing the necessary electromagnetic field. The same electrodes $a$ through $d$, are also connected to the signal responsive means 23, to which is also connected the orthogonal flow velocity signals Ux and Uy. Signal responsive means 23 produces another pair of orthogonal flow velocity DC signals UA and UE respectively, for flow parallel, and perpendicular to the direction established by the artificial field. In addition, the signal responsive means 23 also produce a signal for driving the electrodes 19 and 20 which serve to produce the artificial field. In addition, if it is desired that the electromagnetic field be related in frequency to the artificially produced field, that frequency information is provided by the conductive connection 24 to the electromagnetic flow meter 22.

To see in detail how the apparatus of the present invention performs the function of translating orthogonally-related components of velocity in one coordinate system to orthogonally-related components of velocity in a known coordinate system, reference is now made to FIGS. 3 and 4A, illustrating a detailed block diagram of the signal responsive means 23.

As shown in FIG. 3, outputs from a pair of electrodes 15a and 15b (two of the four electrodes on a typical transducer 15) are connected to a differential amplifier 25. Likewise, the other electrodes 15c and 15d are connected to the input of a similar differential amplifier 25'. The outputs of the amplifiers 25 and 25' are connected to respective sample and hold circuits 26 and 26', the outputs of which are connected to respective bandpass amplifiers 27 and 27'. The outputs of each of the bandpass amplifiers are connected respectively to phase sensitive demodulators 28 and 28', whose outputs are respectively connected to low pass filters 29 and 29'. The output of low pass filter 29 is labeled Vx, and the output of low pass filter 29' is Vy. Each of these are DC signals proportional to the components of the field V in the X and Y coordinate system established by the transducer. These voltages may, if desired, be read out on meters 30 and 30', connected as illustrated in FIG. 3.

In addition to the foregoing apparatus, a clock 31 drives a divider 32 which is connected respectively to decoder 33 and divider 37. One output of the decoder 33 drives each of the sample and hold circuits 26 and 26', another output of decoder 33 drives phase sensitive demodulators 28 and 28', and finally, a third output of decoder 33 drives push-pull amplifier 34. The output of push-pull amplifier 34 is connected to electrodes 35 and 36 which are respectively connected to the artificial field producing means 19 and 20. The output of divider 37 drives a decoder 38 whose output is connected to the signal processing circuit for the convenntional water current meter, such as that shown in FIG. 15 of U.S. Pat. No. 3,759,097. In this case, of course the oscillator 120 divider 122 and decoder 124 shown in that patent may be omitted.

In operation, clock 31 produces signals at an appropriate frequency, preferably of square wave type form, and the requirements in choosing the appropriate frequency will become clear as this description proceeds. The divider 32 operates to divide, in a digital fashion, the output of the clock 31. Decoder 33 is responsive to the output of divider 32 and itself provides three different outputs; one of these is connected to the input of a push-pull amplifier 34 whose outputs are connected to terminals 35 and 36 which are intended to drive the electrodes 19 and 20 for establishing the artificial field. Preferably the artificial field is an electric field. From the point of view of having a uniform, that is, uni-directional, field between the electrodes 19 and 20, these electrodes should be of planar form such as sheets. The uni-directional field has the advantage that the direction of the field remains unchanged, even through the position of the transducer may vary due to water currents and the like. However, it may not be feasible to supply a sheet-type electrode with sufficient current, and therefore, two other forms of electrodes can be employed. In one form, electrodes 19 and 20 can be point electrodes. With this form of electrode, the field is symmetrical although not uni-directional. However, if the transducer is located in the vicinity of the midpoint between the electrodes 19 and 20, the field it will sense will be substantially uni-directional, even though the transducer may be slightly off-axis. The problem with the point electrode is that it presents a relatively high impedance to the amplifier. Therefore, the preferred form of electrode is a cylinder which, at distances which are substantial multiples of its height, appears as a point electrode. In order to avoid electro-chemical effects the waveform delivered to these electrodes should have substantially zero DC component. Therefore, one waveform that is usable is symmetrical about the zero amplitude position; in certain embodiments, however, it may be desirable to provide a waveform with zero DC component which is, however, not symmetrical with regard to zero amplitude.

The components of the field produced by electodes 19 and 20 are sensed by the electrodes on the transducer. Each of these electodes senses the potential, due to the field, at its location. Since electrodes 15a and 15b are connected to differential amplifier 25, the output of this amplifier will be proportional to the difference in that potential, i.e., the component of the filed, in the direction X (see FIG. 4D). Likewise, the output of differential amplifier 25 is proportional to the component of the field in the direction Y (see FIG. 4D). Each of these outputs is connected respectively to a different sample and hold circuit, 26 or 26'. Another of the outputs of decoder 33 supplies the timing signal for the sample and hold circuits. For instance, this output of decoder 33 can take the form of waveform D of FIG. 16 of U.S. Pat. No. 3,759,097. The output of each of the sample and hold circuits is substantially a pulse type waveform. When this waveform is passed through the bandpass amplifiers 27 and 27', substantially only the first harmonic, i.e., the sinusoidal signal of the first harmonic making up this squarewave is coupled to the phase-sensitive demodulator 28. Another output from the decoder 33, which can take the form of waveform E of FIG. 16 of the aforementioned patent, operates the phase-sensitive demodulators 28 and 28'. The output of the phase-sensitive demodulator has a DC component with a value proportional to the field component in the associated direction and polarity representing the polarity of the field. Low pass filters 29 and 29' remove any demodulation noise so that substantially a DC output is provided respectively as Vx, Vy, which may be indicated on meters 30 and 30'.

The substantially DC voltages Vx and Vy are components of the field at the location of the transducer in respectively the X and Y directions, as established by the transducer, that is, they are in the unknown coordinate system.

With the information provided by these signals, the apparatus of the present invention then operates on the flow induced signals to derive orthogonal components of the flow velocity parallel and perpendicular to the direction established by the artificial field. The manner in which this is accomplished is illustrated in FIGS. 4A through 4C. More particularly, referring to FIG. 4A, a reference clock 39 is provided operating at a suitable frequency, which need not be related to the frequency of operation of the previously recited components. Rather, this reference frequency is employed as the "carrier" provided to balanced modulators 40 and 41. The modulating signals provided to these modulators are respectively Vx and Vy, the production of which has been explained with reference to FIG. 3. Although I illustrate balanced modulators, that is not essential to the invention, and they can be replaced by choppers and bandpass filters, or other circuits which will result in modulating the reference signal with the DC voltages Vx and Vy. Thus, the output of the modulators 40 and 41 are signals at the frequency of the clock 39 whose amplitude is related to the amplitudes of respectively Vx and Vy. These are summed by a vector-summing network 42. One example of such a vector-summing network is illustrated in FIG. 4B and it simply comprises a serial connection of a resistor and a capacitor, with the output taken at the junction. This output is provided to a buffer amplifier 43 whose output is provided to a pair of phase shift circuits 45 and 46.

The output of the vector-summing network 42 may also be provided, although not necessarily, to a circuit 44 for obtaining the absolute value of the output of the vector-sum circuit. This can be employed in a servo-loop to control the gain of the power amplifier 34 (shown in FIG. 3). With such control the amplitude of the output of the vector-summing network 42 can be maintained constant, which is desirable for efficient signal processing, but which is not essential to operation of the invention.

The phase-shifting network 45 and 46 can take the form illustrated in FIG. 4C, wherein each comprises a resistor serially connected to a capacitor between the output of buffer 43 and ground. In the case of the phase shift network 45 the resistor is connected to the output of buffer 43 and a capacitor is connected between the resistor and ground, with the output taken at the junction of the resistor and capacitor. In the case of the phase shifting network 46, the output of buffer 43 is provided to a capacitor and a resistor is connected between that capacitor and ground, with the output taken again at the junction of the resistor and the capacitor.

Each of the respective outputs is then provided to a balanced modulator 47 and 48. These circuts, as well, need not comprise balanced modulators but can comprise, if desired, the circuits mentioned with respect to modulators 40 and 41. The modulating signal provided to these circuits are Ux and Uy, respectively, the flow voltages sensed by the transducer in the X-Y coordinate system.

Apparatus for deriving these signals is not illustrated herein, and can take the form of any conventional electromagnetic water current meter, such as that disclosed in my patent 3,759,097.

Each of the balanced modulators 47 and 48 produces, at its output, a signal whose amplitude is related to the modulating signal, either Ux and Uy, with frequency and phase determined by the input from respective phase shift networks 45 and 46. Of course, the frequency of both these signals is identical to that produced by the reference clock 39. The pahase, however, is dependent on the respective amplitudes of Vx and Vy, as will be explained in more detail hereinafter. The outputs of the balanced modulators 47 and 48 are summed in a summing network 49, which can comprise merely a pair of series-connected resistors. The output of the summing network 49 is provided to a pair of phase-sensitive demodulators 50 and 51. The phase-sensitive demodulator 50 may be driven by the reference clock 39 and the phase-sensitive demodulator 51 may be driven by a phase-shifted version of the output of reference clock 39, phase shifted by 90° by phase-shift network 54. The output of each of the demodulators is provided to a different one of low pass filters 52 and 53. Their respective outputs are $U_A$ and $U_E$, which are DC voltages having amplitudes corresponding to the component of the flow velocity parallel and perpendicular to the direction V established by the artificial field. These voltages may be visually transduced via meters 55 and 56.

Except for the specific circuits illustrated in FIGS. 4B and 4C, the circuits employed in FIG. 4A are conventional and no further description thereof is deemed necessary.

The outputs of the balanced modulators 40 and 41 can be through of as signal expressed as Vxcoswt and Vycoswt, wherein w corresponds to the frequency of the reference clock 39. The output of the summing network 42, which performs a vector addition can be expressed as $V\cos(wt + \phi - 45°)$ wherein $V^2 = Vx^2 + Vy^2$ and $\phi = \arctan Vx/Vy$.

The remaining portion of the circuit does not operate on the amplitude information, but instead operates on the information contained in the phase of the signal. The phase-shifting network 45 and 46 merely correct the phase of the outputs to compensate for the phase-shift introduced by the vector-summing network 42. The output of phase-shift network 45 is a signal at the frequency of the clock 39 with a phase angle of $\phi$-90°, whereas the output of phase-shift network 46 is another signal at the frequency of clock 39 having a phase of $\phi$. The modulation process does not alter the phase of the signal, but merely varies its amplitude in accordance with he modulating signal. Thus, sinusoidal signals at respective phases are added by summer 49, which makes the sum available to each of phase sensitive demodulators 50 and 51. One signal is demodulated at reference phase and another is demodulated phase shifted 90° with respect to reference phase. The demodulated signals, after being low pass filtered to remove any extraneous demodulation noise, are DC signals respectively related to the components of flow velocity parallel and perpendicular to the direction V established by the artificial field.

In this embodiment, the phase sensitive demodulation effected by demodulators 28 and 28' was performed with knowlege of the sense of the field, i.e., there was no ambiguity in the field driecton. Without this information, it might be difficult to determine proper field polarity, and thus its direction along the V axis (i.e., a potential 180° direction ambiguity). Since the same signal which drives the power amplifier 34 is made available by decoder 33, which also drives the phase sensitive demodulators 28 and 28', this is not a significant factor in this embodiment. However, the present invention also finds utility in a different type of transducer which does not include the signal conditioning unit 10 (see FIG. 1). In this embodiment, each transducer is self-contained, and may, for instance, include a power source such as a battery, for driving the electomagnet and a data recorder for recording signals definitive of flow velocity and direction. Under these circumstances, and with a symmetrical signal driving the electrodes 19 and 20, there indeed may be some ambiguity with regard to the direction of the field along the V axis. To remedy this difficulty, however, it is only necessary to provide an unsymmetrical waveform at the electrodes 19 and 20, maintaining, however, the zero DC value. The design of the equipment to employ such driving waveform, and to generate the same, should be apparent to those skilled in the art, and therefore, a detailed discussion thereof is not believed necessary.

I claim:

1. A device for producing signals representative of orthogonal flow velocity components with reference to a known coordinate system, including an electromagnetic flow transducer, producing signals representative of orthogonal flow velocity components with reference to an unknown coordinate system, which further includes,
   an artificial field generator for producing a field with predetermined orientation relative to said known coordinate system,
   sensing means, integral with said transducer, for sensing orthogonal components of said field in said unknown coordinate system, and producing signals related thereto,
   signal responsive means, responsive to said transducer-produced signals, and to said sensing means-produced signals for providing signals representative of orthogonal flow velocities in said known coordinate systems.

2. The device of claim 1 in which said artificial field is an alternating field.

3. The device of claim 1 in which said artificial field is an alternating field with zero average amplitude.

4. The device of claim 1 in which said artificial field is an electric field.

5. The device of claim 4 in which said electric field is an alternating field with zero average amplitude.

6. The devide of claim 1 in which said dectromagnetic flow transducer generates an AC magnetic field of one frequency,
   said artificial field generator operating at a frequency realted to said one frequency.

7. The device of claim 6 in which said artificial field generator produces an electrical field of zero average amplitude at a frequency which is multiple or sub-multiple of said one frequency.

8. The device of claim 1 in which said artificial field generator includes a pair of electrodes for generating an electric field of zero average amplitude.

9. The device of claim 8 in which each said electrode is spaced from another with predetermined orientation relative to said known coordinate system.

10. The device of claim 9 in which said flow transducer is spaced from one of said electrodes and colinear with a line joining said electrodes.

11. The device of claim 9 in which said flow transducer is located midway between said electrodes.

12. The device of claim 9 in which each of said electrodes is cylindrical.

13. The device of claim 12 in which said flow transducer is spaced from at least one of said electrodes by a distance several times the height of said electrode.

14. The device of claim 12 in which said flow transducer is sapced from both said electrodes by at least several times the height of said electrodes.

15. The device of claim 9 in which each of said electrodes is a sheet electrode.

16. The device of claim 9 in which each of said electrodes is a sheet electrode.

17. The device of claim 1 in which said electromagnetic flow transducer includes at least a pair of sensing electrodes, and said sensing means includes said at least a pair of sensing electrodes.

18. The device of claim 17 in which both said electomagnetic flow transducer and said sensing means includes a single set of four electrodes.

19. The device of claim 17 in which said electromagnetic flow transducer signals are at one frequency and said sensing means produced signals are at another frequency.

* * * * *